(12) United States Patent
Frost et al.

(10) Patent No.: US 11,616,377 B2
(45) Date of Patent: Mar. 28, 2023

(54) SMART ENERGY STORAGE CELLS, CONTROL METHOD AND SYSTEM

(71) Applicant: Oxford University Innovation Limited, Oxford (GB)

(72) Inventors: Damien Frost, Oxford (GB); David Howey, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 641 days.

(21) Appl. No.: 16/482,865

(22) PCT Filed: Feb. 1, 2018

(86) PCT No.: PCT/GB2018/050293
§ 371 (c)(1),
(2) Date: Aug. 1, 2019

(87) PCT Pub. No.: WO2018/142139
PCT Pub. Date: Aug. 9, 2018

(65) Prior Publication Data
US 2020/0235439 A1    Jul. 23, 2020

(30) Foreign Application Priority Data
Feb. 2, 2017  (GB) .................................... 1701751

(51) Int. Cl.
*H02J 7/00* (2006.01)
*H01M 10/42* (2006.01)
(Continued)

(52) U.S. Cl.
CPC ....... *H02J 7/0016* (2013.01); *H01M 10/4257* (2013.01); *H01M 10/441* (2013.01); *H02M 7/4835* (2021.05)

(58) Field of Classification Search
CPC ... H01M 10/4257; H01M 10/41; H02J 7/0016
See application file for complete search history.

(56) References Cited

U.S. PATENT DOCUMENTS

| | | | |
|---|---|---|---|
| 10,910,859 B2 * | 2/2021 | Frost | H02J 7/00711 |
| 2011/0148374 A1 * | 6/2011 | Gizara | H05B 45/3725 |
| | | | 323/282 |
| 2013/0038306 A1 * | 2/2013 | Kelly | H02M 3/33515 |
| | | | 323/283 |
| 2013/0249517 A1 * | 9/2013 | Shiraishi | H02M 3/157 |
| | | | 323/283 |

(Continued)

FOREIGN PATENT DOCUMENTS

DE    10 2011 003861 A1    8/2012

OTHER PUBLICATIONS

International Research Report & Written Opinion for PCT/GB2018/050293, dated Apr. 30, 2018, pp. 1-24.

(Continued)

*Primary Examiner* — Sarah A. Slifka
*Assistant Examiner* — Aaron J Salter
(74) *Attorney, Agent, or Firm* — Thomas|Horstemeyer, LLP

(57) ABSTRACT

A smart cell, comprising: a positive terminal; a negative terminal; a switching circuit which is arranged to select between a first switching state in which an energy storage device is connected between the positive terminal and the negative terminal and a second switching state which bypasses said energy storage device; an inductor provided between the positive terminal and the output of the switching network; and a controller arranged to monitor the voltage across the inductor and arranged to control a duty cycle of the switching circuit based on the magnitudes of voltage changes detected across the inductor. By monitoring and analysing the magnitude of voltage changes across the inductor, the controller determines the states of charge of other series connected smart cells without any communication between cells. None of the smart cells need to transmit (Continued)

information on their states of charge to other smart cells in the string as each cell can sense information about the other cells from the voltage changes on the inductor. By analysing the voltage across the local sense inductor, the average state of charge of a series string of smart cells can be obtained and compared to the state of charge of the local smart cell to determine how the duty cycle of the local smart cell should be modified to synchronize its state of charge with the series string. The magnitude of the voltage change across the inductor is related to the state of charge of the cell that just switched in or out of the string.

16 Claims, 9 Drawing Sheets

(51) Int. Cl.
*H01M 10/44* (2006.01)
*H02M 7/483* (2007.01)

(56) References Cited

U.S. PATENT DOCUMENTS

| 2014/0265897 A1 | 9/2014 | Taipale et al. |
| 2014/0266069 A1* | 9/2014 | Deboy ............... H02J 7/00712 |
| | | 320/137 |
| 2017/0364131 A1* | 12/2017 | Mellteg ............ H02M 3/33515 |

OTHER PUBLICATIONS

Frost Damien F et al: "Novel MMC control for active balancing and minimum ripple current in series-connected battery strings", 2015 17th European Conference on Power Electronics and Applications (EPE 15 ECCE—Europe), Jointly Owned by EPE Association and IEEE PELS, Sep. 8, 2015 (Sep. 8, 2015), pp. 1-7.
European Office Action for Application No. 18703838.5, dated Jan. 21, 2022, pp. 1-12.
International Preliminary Report on Patentability for PCT/GB2018/050293, dated Aug. 6, 2019, pp. 1-17.

* cited by examiner

SMART ENERGY STORAGE CELLS, CONTROL METHOD AND SYSTEM

CROSS-REFERENCE TO RELATED APPLICATIONS

This application is the National Stage of International Application No. PCT/GB2018/050293, filed Feb. 1, 2018, which claims the priority to GB 1701751.8, filed Feb. 2, 2017, which are entirely incorporated herein by reference.

The invention relates to smart cells and control methods and systems for such cells.

Power electronics is playing a key role in the reduction of greenhouse gas emissions through the integration of green energy technologies with the grid. One area of increased power electronics penetration is electrical energy storage systems such as lithium-ion battery packs, where the market is growing very rapidly as costs decrease. This rapid adoption of grid-connected energy storage requires state of the art power electronic converters and energy management systems. Furthermore, since the energy storage device (batteries, for example) is the most expensive component, the power electronics should be designed to maximise performance and lifetime whilst ensuring safety. In the worst case scenario, an unmanaged series string of batteries will be limited by the weakest cell, thus a single failed cell can render the entire string useless.

Alongside this, many companies who sell electric vehicles (EVs) and hybrid electric vehicles (HEVs) are investigating innovative ways to handle the influx of battery waste from these vehicles. The battery of an EV or HEV is considered to be at the end of its (first) life if its state of health (SOH), usually measured in terms of nominal capacity, falls to around 70%-80% of its original value. Although at this point the battery pack may be considered useless for portable applications, it still contains a lot of residual value for stationary energy storage applications.

In energy storage systems that use electrochemical cells, long term pack performance can be greatly improved by active energy management at the individual cell level, by placing an individual power converter and battery management system on every cell. Recent advancements in wide band gap switching devices, whose cost is expected to decrease over time, will increase conversion efficiencies (and reduce power losses), and reduce overall system costs through higher power density and decreased cooling requirements.

For certain cell chemistries, individual cell monitoring is necessary, and active cell balancing enhances performance. As an example, lithium ion battery technology is unsafe if overcharged, where cells may explode or rupture. Therefore, in order to maximize the energy storage potential of several cells connected in series and/or in parallel, especially cells of varying capacities and usage histories, the state of charge (SOC) of individual cells in a battery pack must be measured and balanced.

Batteries (or other energy storage devices) that incorporate an element of control or management of the charging and/or discharging of the energy storage device may be referred to as smart cells. The energy storage device may include any of batteries (particularly rechargeable batteries), capacitors, supercapacitors, etc. A cell may include a small pack or sub-pack of storage devices. The level of granularity is adjustable by the designer.

Battery management systems (BMS) (a typical form of smart cell control) are used in every modern battery pack to ensure that the cells which make up the pack are operated within their safety limits. As the battery pack ages, the capacity of each cell changes over time in a non-uniform manner, and the state of charge of individual cells begin to drift apart from each other. To avoid this drift, the BMS will balance the state of charge of each individual cell, usually through a dissipative means. For example, during the charging phase, cells which reach their maximum voltage before others will be connected to a discharging resistor until all of the cells in the pack are fully charged. This method of balancing cells works well for well-matched battery packs, however when cells of varying capacities are connected together it is very inefficient and slow.

A modular multi-level converter topology is essentially a series string of energy storage devices, each of which can be connected in line (i.e. to supply energy or receive energy) or bypassed (i.e. not supplying or receiving energy). Such arrangements are typically used for DC to AC voltage conversion, where each module includes a capacitor. By controlling how many (and which) capacitors in the string to connect in series, the output voltage of a node on the string can be varied so as to produce the desired waveform (e.g. a sinusoidal AC waveform).

According to a first aspect, there is provided a smart cell, comprising: a positive terminal; a negative terminal; a switching circuit which is arranged to select between a first switching state in which an energy storage device is connected between the positive terminal and the negative terminal and a second switching state which bypasses said energy storage device; an inductor provided between the positive terminal and the negative terminal; and a controller arranged to monitor the voltage across the inductor and arranged to control a duty cycle of the switching circuit based on the magnitudes of voltage changes detected across the inductor.

By monitoring and analysing the magnitude of the voltage changes across the inductor, the controller can determine the states of charge of other series connected smart cells without any communication between cells. In other words, none of the smart cells in a series connected string of smart cells need to transmit information on their states of charge to other smart cells in the string as each cell can sense information about the other cells from the voltage changes on the inductor. By analysing the voltage across the local sense inductor, the average state of charge of a series string of smart cells can be obtained. This can be compared to the state of charge of the local smart cell to determine how the duty cycle of the local smart cell should be modified to synchronize its state of charge with the series string. In particular, it has been recognised that the magnitude of the voltage change across the inductor is related to the state of charge of the cell that just switched in or out of the string (thus causing the voltage change).

Preferably the voltage changes are monitored and measured over a time window. The time window is preferably at least one switching cycle, although any suitable time window may be used. For example a longer time such as a plurality of switching cycles may be used so as to ensure all other cells have switched at least once, or indeed more than once within the time window. Preferably all cells in a string are programmed to have the same switching frequency. In practice, their switching frequencies may be slightly different, but they are typically close enough that they can all detect every switching event within a single switching cycle window.

The controller may control the duty cycle based on the magnitudes of the voltage changes alone. However, in some embodiments the controller may be arranged to control the duty cycle of the switching circuit based on the magnitudes of voltage changes detected across the inductor and a value representative of a current state of charge of the energy storage device. That value may be stored in a memory (e.g. volatile memory such as RAM or persistent memory such as flash storage), or it may be measured directly from the energy storage device. It will be appreciated that the one such voltage change across the inductor will correspond to the switching of the smart cell's own switching circuit and thereby provides a measurement of the current state of charge of the energy storage device of the smart cell. This measurement may be used to compare the state of charge of the smart cell's energy storage device with the states of charge of other connected smart cells.

The controller may be arranged to calculate a value representative of the average state of charge of all energy storage devices connected in series or parallel with the smart cell. It will be appreciated that the controller may calculate this average for all other cells in the series connected string (i.e. excluding its own cell), or it may calculate the average for all cells in the series connected string (i.e. including its own cell).

It will thus be appreciated that in some preferred embodiments the value representative of the average state of charge is the average magnitude of voltage changes detected across the inductor, or a value based on said average.

As part of the averaging process the controller may count the number of series connected cells in the string. This may be achieved in any suitable way, but for example may be by counting over a particular time window, or by looking for a repeating pattern, or by counting unique magnitudes, or counting the number of switching events, etc. E.g., as every cell must switch in and switch out of the circuit every cycle, counting the number of switching events and dividing by 2 gives the number of cells in the string.

The controller may control the duty cycle of the switching circuit according to any desired goal, e.g. to achieve a desired distribution of cell usage. However, in some preferred embodiments the controller is arranged to control the duty cycle of the switching circuit so as to synchronise the state of charge of the energy storage device with the calculated average state of charge. By synchronising the state of charge with the average state of charge the cell's state of charge can be brought into line with all the other cells' states of charge so that all cells charge and/or discharge at the same rate. As described above, this is particularly beneficial where cells in the string may have different capacities as it prevents individual cells from becoming depleted much earlier than the other cells and thus reducing the effectiveness of the string of cells as a whole.

By controlling each cell to synchronise its state of charge with an average state of charge in the string, each cell ends up charging and/or discharging proportional to its capacity, i.e. cells with larger capacities will be used more than cells with lower capacities. By using each cell in proportion to its capacity, the weaker cells are used less and the stronger cells are used more. This avoids the problem of the weakest cell in the string failing and causing the whole string to become inoperational. Instead, all cells should reach their individual maximum charge and/or maximum discharge at around the same time, maximizing the overall usage of all the cells as well as extending the lifetime of each individual cell.

In previous research the duty cycle for cells has been determined by comparing the capacity of the battery cell to a given, maximum capacity that would be found in the system. This maximum capacity had to be preset by the system designer, or programmed into the system at any time (e.g. updated as batteries were added and/or removed). By contrast, with the present arrangement no such external input or programming is required. Instead, each cell senses the other cells in the system and self-regulates to synchronise its state of charge with the others.

The duty cycle of the cell may be adjusted so as to cause the energy storage device's state of charge to begin to align with the average. For example, while discharging: if the state of charge is above-average then the duty cycle is increased so as to draw more energy from the cell until its state of charge has reached the average state of charge. Likewise if the cell's state of charge is below average then the duty cycle is decreased so as to reduce energy draw from the cell until the average state of charge has reduced to the same level. A similar approach may be applied for a charging regime. The amount of adjustment of the duty cycle may be related to the difference between the current state of charge and the average state of charge. It will be appreciated that different algorithms may be used to synchronise the state of charge. For example, in one extreme, the duty cycle could be set to zero or to maximum in order to bring the state of charge in line with the average in the shortest time possible. However, in order to avoid such extremes of duty cycle the adjustments may be smaller and designed simply to move the state of charge towards the desired average state of charge at a constant rate, or at an exponentially decreasing rate. In other examples, the duty cycle may be adjusted in a critically damped fashion so as to minimise the time to synchronise, but without risk of oscillations.

In other examples, the controller may control the duty cycle of the switching circuit with a proportional-integral controller. The PI controller can bring the state of charge into line with a constantly changing average state of charge (as the other cells in the string adjust charge or deplete or adjust their own duty cycles).

As each cell in a string is independently controlled and independently adjusts its own switching timings, two (or more) cells may over time synchronise both their duty cycles and their phases. In such circumstances, two (or more) cells may switch on and off at the same times. This means that the detected voltage changes on the inductor cannot readily be separated into measurements of individual cells and therefore a cell cannot accurately calculate the average state of charge. Thus the cell cannot accurately determine how to adjust its own duty cycle. Where two cells are fully in phase, the situation might be resolvable by determining that the magnitude is too great to be that of one cell (and can thus be split into two cells). However a similar situation also arises where one cell switches on at the same time as another cell switches off. This is a more difficult problem to resolve as there may be no detectable voltage change on the inductor. Therefore in preferred embodiments the controller is arranged to determine whether or not it has obtained sufficient information from the detected voltage changes across the inductor to perform suitable control of the duty cycle. This may be done for example by counting the number of detected transitions and comparing to an expected number of transitions (e.g. based on a previous count of the number of cells). When such a problem is detected, the cell may be arranged to take action immediately. However, as the duty cycle control is a long-term control loop, it may be acceptable to overlook such problems in the short term. As the cells constantly evolve their timings, the problem may well be short-lived and accurate measurements made once again. Therefore in some examples the controller may be arranged to take action only after the problem (i.e. the lack of sufficient information) has persisted for a predetermined time period. In some examples, that time period may be at least 30 seconds, at least a minute or at least two minutes.

Preferably when the controller determines that insufficient information has been obtained (and optionally, where this has persisted for the predetermined time period), the controller adjusts the duty cycle of the switching circuit. Thus the controller forces its own duty cycle to change so as to ensure that its transitions do not overlap exactly with those of another duty cycle of another cell. Once the problem has been removed, the control algorithm will naturally bring the duty cycle back in line with the desired value.

In order to ensure that two cells do not make the same adjustment simultaneously (which would avoid rectification of the problem), the cell may adjust its duty cycle by a random amount, or by a fixed amount in a random direction.

Preferably the inductor is in series with the switching circuit. This means that the inductor is always connected between the positive and negative terminals regardless of the switching state of the switching circuit, i.e. regardless of whether an energy source is connected between the terminals or is bypassed. In this configuration the inductor can continue to act as a current change detector and as part of a distributed filtering inductor even when the switching circuit is in a bypass state. The inductor may be connected either side of the switching circuit, i.e. between the switching circuit and the positive terminal or between the switching circuit and the negative terminal. The inductor need not be directly connected to either terminal or to the switching circuit (there may be other intervening components or circuits).

As the inductor is part of the smart cell, it forms part of a decentralized controller strategy to regulate the state of charge of cells within a larger system. For example, it may form part of a decentralized controller strategy to regulate the state of charge of serially connected cells of varying capacities.

Another advantage of providing an inductor as part of the smart cell is that it forms part of a distributed filtering inductor. A filtering inductor would normally be provided for a string of cells (e.g. in a modular multi-level controller) as a single separate component in series with the cells. Splitting this into several smaller inductors in a distributed arrangement allows smaller components to be used, which can significantly reduce cost.

Preferably the controller is arranged to adjust the switching timing of the switching circuit based on said inductor voltage.

In a modular multi-level control topology, it has been found that this enables a local controller to determine when to switch in and out its energy storage device. This avoids the need for an overall controller that controls all modules (i.e. it permits decentralized control). One advantage of this is that the local controller can travel with its own energy storage device, retaining information about its history, e.g. state of health (SOH) and state of charge (SOC) information. Another advantage of the local controller is that there is no need for a system-wide communications bus to transfer information between cells or between the cells and a separate system-wide controller.

The switching circuit will typically switch its energy storage device in and out on a periodic cycle having a time period, a duty cycle (which may be represented as a proportion of the time period in which the storage device is connected rather than bypassed) and a phase (which may be represented as a start time relative to the start of the cycle). Adjusting the switching timing of the switching circuit may include adjusting any of: the duty cycle, the phase, the time period or frequency of the switching cycle.

The controller may be arranged to perform any kind of control function according to the desired characteristics of the system. However, in some preferred embodiments the controller is arranged to determine, based on the inductor voltage, a desired timing for the switching circuit that minimises the impact on the output voltage ripple (e.g. of a series string of smart cells) and is arranged to adjust the timing for the switching circuit towards the desired timing.

For a DC to DC converter, it is desirable to minimise the output voltage ripple so as to provide the smoothest possible output. In a string of series-connected energy storage devices, every time a device is switched in or out the output voltage jumps.

If two devices are connected simultaneously, or at very similar times then the voltage jump will be large (i.e. there is a large ripple). It is therefore desirable to minimise this so that the output voltage overall is as consistent as possible. As each controller in the system can detect the switching events of other devices within the system via its inductor, each controller can attempt to minimise its impact on the overall voltage ripple by varying its timing.

Although the controller could adjust its timings to exactly the calculated desired timings, this may result in instability when several such controllers all operate individually at the same time. In order to encourage an equilibrium situation to be reached it is preferred that the controllers each make smaller timing adjustments towards the target timings. Preferably the controller is arranged to adjust the timing at a rate proportional to a duty cycle of the switching circuit. The duty cycle is likely to vary slightly from one cell to another and therefore this avoids synchrony with other cells in a system and encourages the different cells to adjust at different rates, thus avoiding unstable operation.

In some preferred embodiments the controller is arranged to: detect changes of current within the system; analyze said changes to determine the switching times of other cells; calculate desired switching times of other cells; calculate desired switching timings for the smart cell based on said changes of current; and adjust the switching timings of the smart cell by adjusting its timings towards the desired switching timings.

The changes in current may be detected by measuring the voltage across the inductor. Preferably to analyze the current changes, the controller is arranged to perform edge detection on the detected current in the system to detect switching times of other cells. As the controller is local to the cell, it cannot easily determine which edges belong to which other cells. In fact, in the most general case it will not even know how many other cells there are in the system, or of what type they are. The detected edges therefore cannot easily be associated with a particular cell. This presents a difficulty in the analysis as it is not possible to determine when a cell switches on and when it switches off, i.e. how long its duty cycle is. Without this information a complete working model of the system is not available. However, as will be explained in more detail later in this document, it has been discovered that detecting the edges in the system current is sufficient to enable a solution to be found. The control algorithm thus allows multiple independent energy sources (energy storage devices) to work together towards a common goal.

Preferably to analyze the changes, the controller is arranged to combine the switching times into pairs of a switching on time and a switching off time. This pairing does not need to match a particular on time and off time, i.e. the on and off times do not need to correspond to the same cell (which the controller cannot determine). Instead, any on and off can be paired together and it can be shown that this is equivalent to matching the correct on and off times. This greatly simplifies the analysis process and allows the system to be modelled in a computationally efficient manner such that the required optimization can be performed.

Preferably the controller is further arranged to form vectors from the pairs, each vector being defined by an angle that is determined by taking the average of the switching on time and the switching off time relative to the switching period of the smart cell and a magnitude equal to the sine of the difference between the switching on time and the switching off time.

This particular transformation has been found to further simplify the optimization problem for determining the optimum switching times for the cell. As will be discussed in more detail below, the optimization problem can be expressed as minimizing a Fourier series expression for the ripple voltage. With this transformation a vector sum of the vectors thus defined is mathematically equivalent to the optimization problem with the Fourier series expanded to first order only. The transformation and vector sum is significantly less intensive to compute than the full Fourier expression and thus allows the optimization problem to be calculated more efficiently and faster. Even though the optimization is only to first order (i.e. the fundamental) of the Fourier series, it has been found, surprisingly, that this leads to a stable solution faster and more reliably than optimizing to a higher order.

Therefore preferably the controller is arranged to minimize the magnitude of the vector sum of all said vectors. This may be achieved by performing the vector sum with the cell's own timings omitted (either omitted from the pairing process, or with the cell's own vector subtracted from the final vector sum). The optimum timings for the cell can then be determined by setting the cell's desired vector to be in the opposite direction to the vector sum and reversing the vector transformation to determine the optimum timings for the cell.

The switching timings may be adjusted simply by adjusting the phase of the switching cycle to an earlier or later time. However, in an alternative, the controller may be arranged to adjust the switching timings by adjusting the switching period of the smart cell. The choice of phase shifting method used may be based on the available hardware in the system. The controller may be arranged to adjust the switching timings by adjusting the timings at a rate proportional to the duty cycle of the smart cell. As discussed above, the duty cycles generally vary between different cells and therefore this has the advantage of causing convergence on the desired timings at different rates which better avoids unstable states.

By distributing the inductor amongst a plurality of cells, the individual inductors can be made smaller. The minimization of components reduces cost. In particularly preferred arrangements, the inductor may be formed as a PCB trace. This is one of the most cost-efficient ways to make an inductor.

Both the phase control (for voltage ripple minimisation) and state of charge control (for cell synchronisation) may be performed on the same cell at the same time. These may be performed by separate controllers, but are preferably part of the same controller. Thus preferably the controller comprises a switching phase controller arranged to adjust the switching timing of the switching circuit in a first control loop and a state of charge controller arranged to adjust the duty cycle of the switching circuit in a second control loop.

As discussed above, the switching timing adjustments performed by the switching phase controller may include adjustments to the duty cycle, but in the preferred embodiments these do not conflict with the duty cycle adjustments made by the state of charge controller. The minimisation of voltage ripple is preferably performed by a much faster control loop than the state of charge adjustments. For example, preferably the first control loop is operated at a higher rate than the second control loop, preferably at least 10 times the rate, at least 20 times the rate, at least 50 times the rate or at least 100 times the rate. Thus in normal operation the voltage ripple will have been minimised or substantially minimised before any further duty cycle adjustments are made by the state of charge controller. It is possible for both loops to operate together. However, in some examples, the state of charge controller may be arranged such that it will not modify the duty cycle until the phase controller has reached a steady state condition. This ensures that the analysis on which the state of charge controller bases its decision is taken from the current steady state situation and not based on unusual voltage switches that may occur during transient conditions.

It will be appreciated that the energy storage device may comprise at least one of a battery, a rechargeable battery, a capacitor or a super-capacitor, or combinations thereof. Other energy storage devices may be used instead. Additionally, the size of the energy storage devices may vary greatly depending on the application. The invention may be used for series connected rechargeable batteries for personal or home devices, but it is expected to be particularly useful in grid-connected energy storage devices which may be of much larger overall capacity (e.g. made up from a very large number of smaller cells). In particular, used cells (e.g. from discarded consumer electronics devices or electric vehicles) which may have degraded from their original capacity may be re-used by combining them together with suitable control electronics into large multi-cell energy storage devices which may be grid-connected. This provides an inexpensive source of storage and is environmentally friendly by re-using cells that would otherwise be deemed end-of-life. For example battery packs for an electric vehicle will no longer be of useful service (and deemed end-of-life) when they cannot support the required range of the vehicle, but may still have significant storage potential that is usable for other applications.

In some embodiments the energy storage device may comprise a plurality of smaller storage devices in parallel and/or series, with a controller arranged to control the energy supply from said smaller devices. The controller that controls such a set of parallel cells may be the same controller as is used as described above for interacting with other series-connected smart cells, or it may be a separate controller that only controls the parallel array of sub-cells.

Thus the invention may be used in energy storage systems to balance the state of charge on every cell in a battery pack. It can also be used in larger contexts, where instead of managing the state of charge of an individual cell, it could be used to manage the state of the charge of one or more battery packs. It will be appreciated that the invention may be employed at multiple levels, e.g. on individual cells within a pack as well as on individual packs within a multi-pack system.

According to another aspect, the invention provides a smart cell system comprising a plurality of smart cells, said cells being connected in series. The smart cells may be as described above, optionally including any of the optional or preferred features also described above. The plurality of smart cells may form a multilevel converter. The multi-level converter may be a DC to DC converter or it may be a DC to AC converter. A multi-level converter formed of a plurality of smart cells could be used in an application where battery cells and super capacitors and other energy storage devices are mixed together in the same string of smart cells. This type of application may be useful for electric vehicles and hybrid vehicles where frequent charge and discharge cycles are present. Furthermore, a series string of smart cells would be very applicable in some electric drivetrain architectures where a large conversion ratio is needed from the battery to the motor drive electronics.

The smart cell system may comprise a plurality of multilevel converters in parallel, i.e. several strings of cells in parallel, each string comprising cells in series, in order to increase the overall capacity of the system to a desired value.

In preferred examples, in the eventual event of a cell failure, the smart cell switching circuit can automatically bypass the failed cell, thus the string remains operational.

It will be appreciated that the smart cell may include the energy storage device or it may be supplied separately. For example the smart cell controller and switching circuitry may be supplied with an empty slot or holder for receiving an energy storage device (such as a rechargeable battery cell or battery pack) or it may be supplied with terminals to which a separate energy storage device may be connected.

According to another aspect, the invention provides a method of controlling a smart cell within a multi-cell system, the smart cell comprising an inductor provided between the positive terminal and the negative terminal, the method comprising: detecting changes of voltage across the inductor; and adjusting the duty cycle of the smart cell based on the magnitudes of the detected changes of voltage across the inductor.

It will be appreciated that the preferred and optional features described above may also be applied to the method. In particular, the method may further comprise: analyzing the magnitudes of said voltage changes to determine the states of charge of other smart cells in the system; and wherein adjusting the duty cycle of the smart cell comprises synchronising the state of charge of the smart cell with the average state of charge of other smart cells in the system. The average state of charge of other smart cells in the system may be calculated from an average magnitude of voltage changes detected across the inductor. When the analyzing step fails to determine the states of charge of all other cells in the system the duty cycle of the smart cell may be adjusted.

Further, analysis in the controller may comprise performing edge detection on the detected current in the system to detect switching times of other cells. Said analysing may comprise a step of detecting the voltage levels to detect when multiple smart cells switch on or off at the exact same time. Said analyzing may comprise combining said switching times into pairs of a switching on time and a switching off time. The method may further comprise forming vectors from said pairs, each vector being defined by an angle that is determined by taking the average of the switching on time and the switching off time relative to the switching period of the smart cell and a magnitude equal to the sine of the difference between the switching on time and the switching off time. Said analyzing may comprise minimizing the magnitude of the vector sum of all said vectors. Adjusting the switching timings may comprise adjusting the switching period of the smart cell. Adjusting the switching timings may comprise adjusting the timings at a rate proportional to the duty cycle of the smart cell.

As discussed above, one of the biggest advantages of the invention is that it enables a large battery pack to balance the state of charge on every cell without any communication necessary between the cells. This greatly simplifies the wiring and sensing necessary within the battery pack. Furthermore, it is envisaged that the power electronics and control algorithm can be packaged together with the cell itself. Therefore, information about the cell's state of health and state of charge will always travel with the cell, for example, if it is installed in another device.

Also, the invention allows modular systems to be designed where the number of cells in the string (i.e. in the pack) is not fixed. Instead, new cells can be added when desired or when available and old cells can be removed as they degrade or if not required any longer. Such flexibility is particularly well suited to the decentralized control model.

In some preferred embodiments, the system will discharge and charge cells of varying capacity in proportion to their capacity. By using a modified modular multilevel converter (MMC) topology, it is possible to achieve this goal. The general MMC topology allows one to connect a cell to the output, or bypass the cell completely.

The control algorithm works because it has been shown through a detailed theoretical analysis (described further below) that it is possible to get a smooth output from a string of switching cells using the information available locally at each cell.

The invention can be used in any scenario where energy sources of varying capacity are connected in series. As well as installing this algorithm at the cell level, it is possible to use the same algorithm with larger packs of cells, or even different combinations of energy sources, like battery cells and fuel cells.

Preferred embodiments of the invention will now be described, by way of example only and with reference to the accompanying drawings in which.

Figures 1A, 1B:
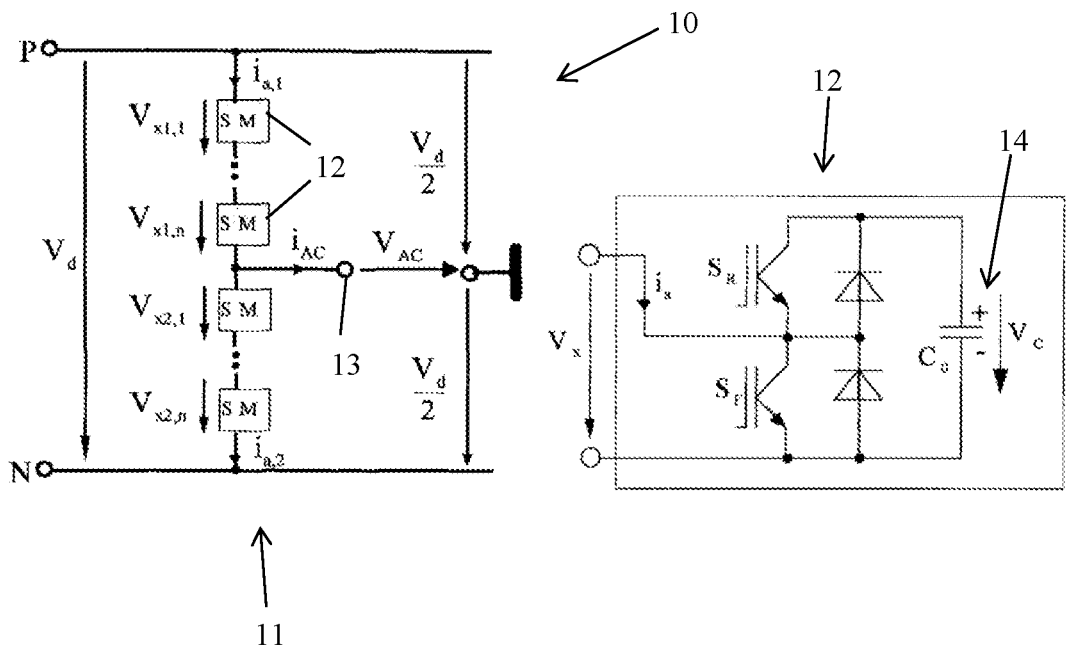
FIGS. 1a and 1b show a standard MMC architecture.

FIG. 1a shows a schematic of a standard modular multilevel converter (MMC) converter 10 made up of a string 11 of sub-modules 12 connected between a positive rail P and a negative rail N. A sub-module 12 is shown in more detail in FIG. 1b. Each sub-module 12 comprises an energy storage device 14 such as a battery or capacitor (although any energy storage device may be used). Sub-module 12 has two switches $S_R$ and $S_F$ which are always in opposite states. When $S_R$ is on (and $S_F$ is off), the energy storage device 14 is connected in series with any other energy storage devices in the string 11. When $S_F$ is on (and $S_R$ is off), the energy storage device 14 is bypassed, i.e. it is not connected into the series string 11.

The output of the converter 10 is taken from central node 13. The voltage at node 13 can be varied by controlling how many of the sub-modules 12 on the positive side and how many modules 12 on the negative side of node 13 connected their respective energy sources 14 in the series string 11 and how many bypass their energy sources 14.

Each sub-module is able to connect the local energy storage source 14 into the series string 11, or bypass it, by sending the appropriate gating commands to the power semiconductor switches $S_R$, $S_F$.

The embodiments of the invention described and shown in the rest of the figures provide a cell level battery management system (BMS) and power converter which uses a decentralized control strategy to regulate the state of charge of serially connected cells, which may be of varying capacities. As mentioned above, previous work in this field includes battery management systems with global information and control, and systems with low bandwidth communication, or a sparse communication network. Conversely, the embodiments presented here introduce a completely decentralized controller that does not rely on any communication. The distributed battery management system can be used to discharge and charge each cell in a series string of cells proportional to its capacity. The converters are also controlled in such a way as to minimize the size of the filtering components in the series string. This is because the phase controller is designed in such a way as to minimize the output voltage ripple, and therefore smaller filtering components can be used.

System Architecture

Figure 2:
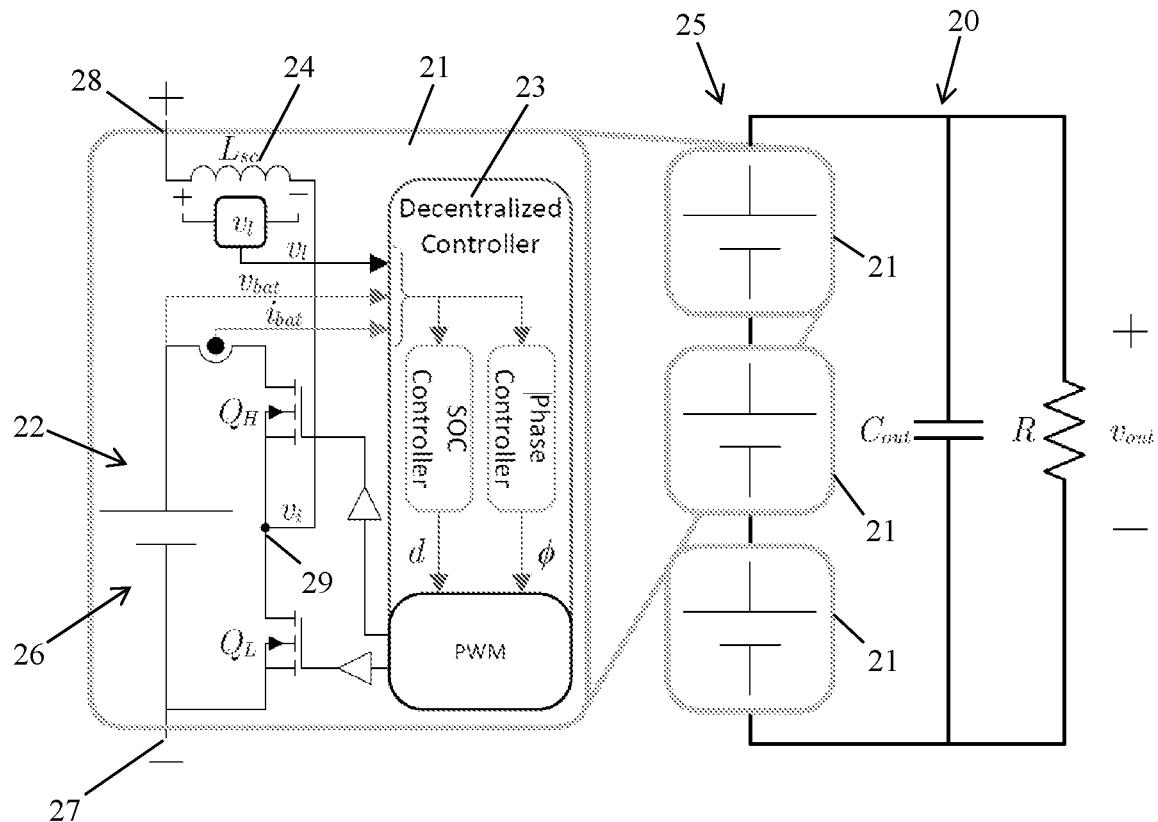
FIG. 2 shows an example system architecture according to the invention.

An example of the proposed system architecture is shown in FIG. 2. FIG. 2 shows a Modular Multi-level Controller (MMC) 20. An MMC topology has already been used to integrate large battery packs for high power applications. However in some preferred examples, what is proposed here is to use the MMC in low power applications. In this example, the system is constructed out of three smart cells 21 each containing a half bridge switching network 22 similar to the switching networks found in the sub-modules of other known MMC converters. Depending on the state of the switches, the switching network 22 either connects the energy storage device (battery cell 20 between the negative terminal 27 and positive terminal 28 of the smart cell 21 or it bypasses the battery cell 26. However each smart cell 21, has two distinct features that make it different from a standard MMC submodule (such as sub-module 12 shown in FIG. 1b):

1. There exists an independent, autonomous controller 23 in each smart cell 21.
2. Each smart cell 21 includes a small filter inductor 24, $L_{sc}$.

The decentralized controller 23 manages the state of charge (SOC), and monitors the state of health (SOH) of its locally connected battery cell. This information is used to apply a duty cycle to the switches $Q_L$ and $Q_H$, such that the connected battery cell 26 discharges in proportion to its capacity. Discharging all battery cells 26 in proportion to their respective capacities yields two large benefits for the string of smart cells 25:

1. The SOC of all of the battery cells 26 in the string of smart cells 25 will be synchronized.

2. Larger, healthier battery cells 26 will be loaded more than the smaller, more degraded battery cells 26, thus the string of smart cells 25 will degrade at a more uniform rate.

Figure 3:
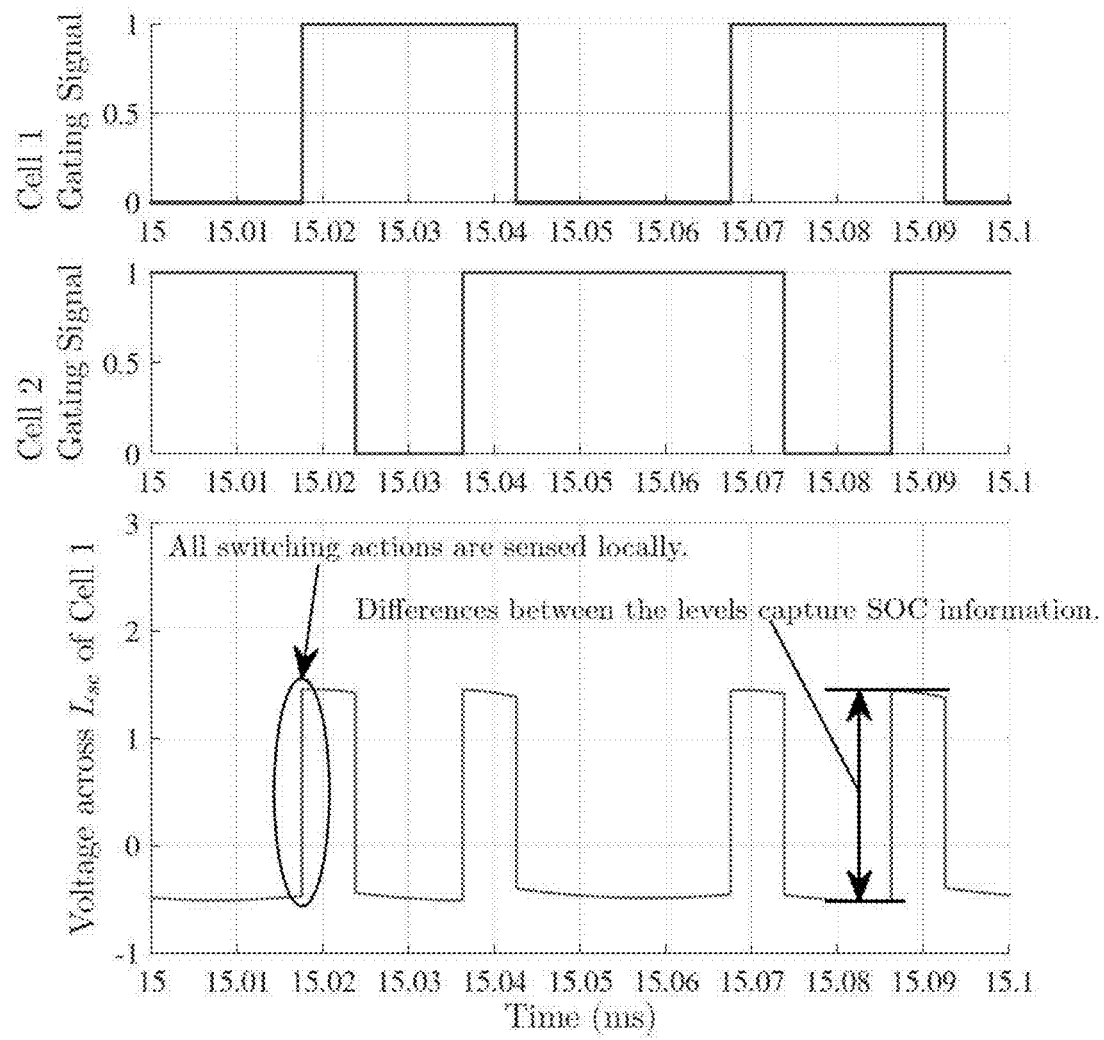
FIG. 3 shows the voltages on the sensing inductor during switching of a two smart cell system.

The voltage, $v_l$, across the small filter inductor, $L_{sc}$, contains all of the information required for each smart cell to determine its optimal switching pattern, and to adjust its duty cycle to synchronize its SOC with the other smart cells in the string. FIG. 3 is a simulation of a two smart cell system switching in its optimal switching pattern, with the voltage across one of the sense inductors shown. As shown in FIG. 3, all of the switching transitions are captured by the sense inductor, $L_{sc}$. The further sections below describe how the optimal switching pattern is obtained using the transitions of $v_l$, how the Phase Controller of FIG. 2 is designed, how the SOC of the string is synchronized using the voltage across $v_l$, and the design of the SOC Controller of FIG. 2.

In addition to sensing, $L_{sc}$ is used as a distributed inductor to provide output filtering. By splitting the output filter inductor amongst every smart cell 21, the inductance is reduced. In some implementations $L_{sc}$ could be small enough to be implemented on the trace of a PCB, thus greatly reducing the cost and size of this component. The dc output to the load simply requires a small filter capacitor, $C_{out}$, whose capacitance depends on the application requirements, i.e. with no additional inductor external to the smart cells 21.

Optimal Switching Pattern

In order to minimize the output voltage ripple measured at $v_{out}$ an optimal switching pattern of all of the switches $Q_H$ and $Q_L$ is determined. This is done by all smart cells 21 collectively minimizing the ac rms inductor current. A full derivation of the results provided here can be found in the inventors' earlier patent application, PCT/GB2016/052507 which is incorporated herein by reference in its entirety.

Given a set of M battery cells with capacities $C=\{C_1, C_2, \ldots, C_M\}$, our objective is to find a set of phases, $\theta=\{\theta_1, \theta_2, \ldots, \theta_M\}$ for the turn-on of each smart cell which will minimize the ripple current in the local inductor $L_{sc}$, and thus minimize the output ripple voltage. It is reasonable to assume that the nominal voltage of all of the battery cells is $V_{nom}=V_1=V_2=\cdots=V_M$, since the SOC of all of the battery cells 26 will be synchronized. The duty cycle of the $i^{th}$ smart cell 21 can be calculated using the following equation:

$$D_i = \frac{C_i}{C_{MAX}} \quad (1)$$

where $C_{MAX}$ is the maximum capacity expected within set C amongst all of the battery cells 26, such that $0<D_i\leq 1$ for all i.

It has been shown by the inventors that an analytical expression for the ac rms inductor current as a function of the smart cells' duty cycles and phase angles is:

$$I_{Lac-rms}^2 = \frac{1}{2}\left(\frac{V_{nom}T_s}{2\pi L}\right)^2 \quad (2)$$

$$\sum_{n=1}^{\infty}\sum_{i=1}^{M}\sum_{j=1}^{M}\frac{4}{\pi^2 n^4}[\sin(\pi n D_i)\sin(\pi n D_j)\cos(\pi n(D_i - D_j) + n(\theta_i - \theta_j))]$$

where $T_s$ is the switching period.

Equation (2) can be minimized to determine an optimal set $\theta = \{\theta_1, \theta_2, \ldots, \theta_M\}$ that will minimize the ac rms current in the inductor $L_{sc}$, and therefore, the output voltage ripple in $v_{out}$.

Simplifying the Problem

Examining (2), we see that solving for an optimal set $\theta$ to minimize $I_{Lac-rms}$ non trivial, and difficult to achieve without significant computational power and global information about the system. Therefore in this section we present a way to identify a set $\theta$ which will yield a satisfactory solution, with significantly less computational requirements, and in a decentralized fashion.

Figure 4:
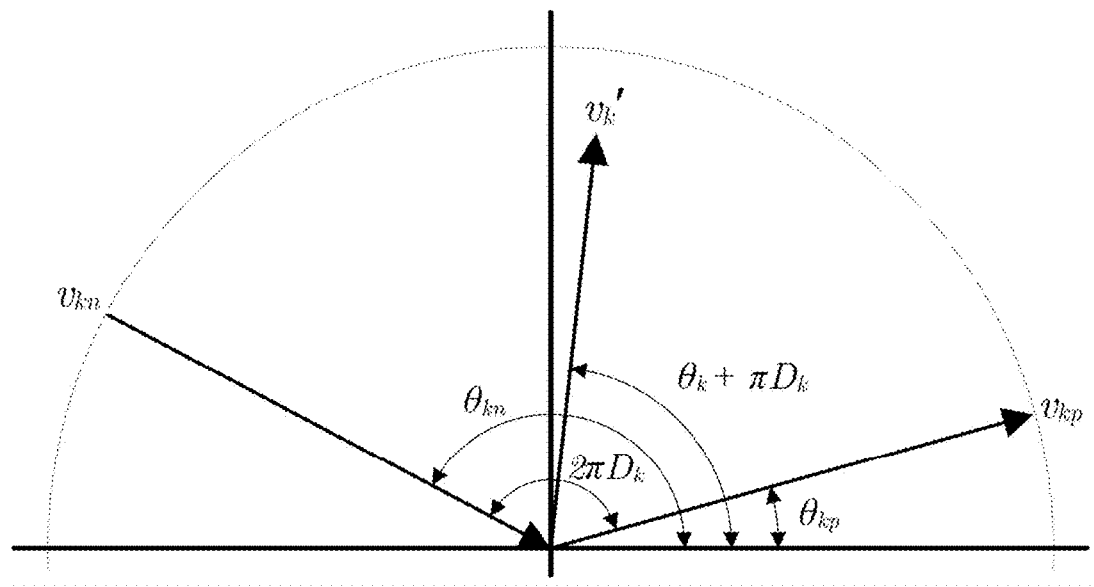
FIG. 4 illustrates the timings of a smart cell as phases and vectors representing the smart cell timings and voltage.

First, let us represent the switching action of the $k^{th}$ smart cell as a vector, $v_k$, in the unit circle as depicted in FIG. 4. The $k^{th}$ smart cell will turn on at $\theta_k$, and turn off at $\theta_k + 2\pi D_k$. Now define a new vector, $v_k'$ which will be known as the weighted vector, whose phase places the vector half way between the turn on and turn off times and whose length is $\sin(\pi D_k)$. Therefore the phase and length of the weighted vector, $v_k'$, are given by:

$$\angle v_k' = \theta_k' = \theta_k + \pi D_k \quad (3)$$

$$|v_k'| = \sin(\pi D_k) \quad (4)$$

Applying the transformation described in (3) and (4) to all of the smart cells, and summing all $v_k'$, we can find the square of the magnitude of the total sum vector, $|v_\Sigma'|^2$:

$$|v_\Sigma'|^2 = \sum_{i=1}^{M} \sum_{j=1}^{M} \sin(\pi D_i)\sin(\pi D_j)\cos(\pi(D_i - D_j) + \theta_i - \theta_j) \quad (5)$$

Equation (5) has the exact same form as (2) when n=1 (i.e. only the fundamental is considered). Therefore, one control algorithm that will yield a sub-optimal but acceptable minimum of (2) is to minimize the magnitude of the total sum vector, $|v_\Sigma'|^2$:

Extracting Information from $v_l$

In order to minimize the magnitude of the total sum vector, $|v_\Sigma'|^2$, found in (5), the duty cycle and phase shift of every smart cell in the string is still required. As shown in FIG. 3, every time a smart cell switches in and out of the string, this transition is captured by every sense inductor, $L_{sc}$, in the string of smart cells. Therefore, by observing when all of the positive and negative transitions occur in $v_l$, the "on" and "off" times of all of the smart cells in the string can be determined. From this information, the phase shift and "on" times of each cell in the string can be determined. The corresponding "off" time, and therefore duty cycle of each cell, cannot be uniquely determined.

However, as the inventors have shown in PCT/GB2016/052507, there is no need to pair the correct "off" transition to its "on" transition in order to minimize (5). Even if "on" and "off" transitions are incorrectly paired together, the same minimum of (5) will be found.

Phase Controller Design

The smart cell controller needs to be designed such that a group of cells working together will minimize (5). By taking the derivative of (5) and setting it to zero, the local minima can be found. The partial derivative of (5) with respect to $\theta_k$ is shown below:

$$\frac{\partial |v_\Sigma'|^2}{\partial \theta_k} = 2\sin(\pi D_k) \sum_{i=1; i \neq k}^{M} \sin(\pi D_i)\sin(\pi(D_i - D_k) + \theta_i - \theta_k) \quad (6)$$

Figure 5:
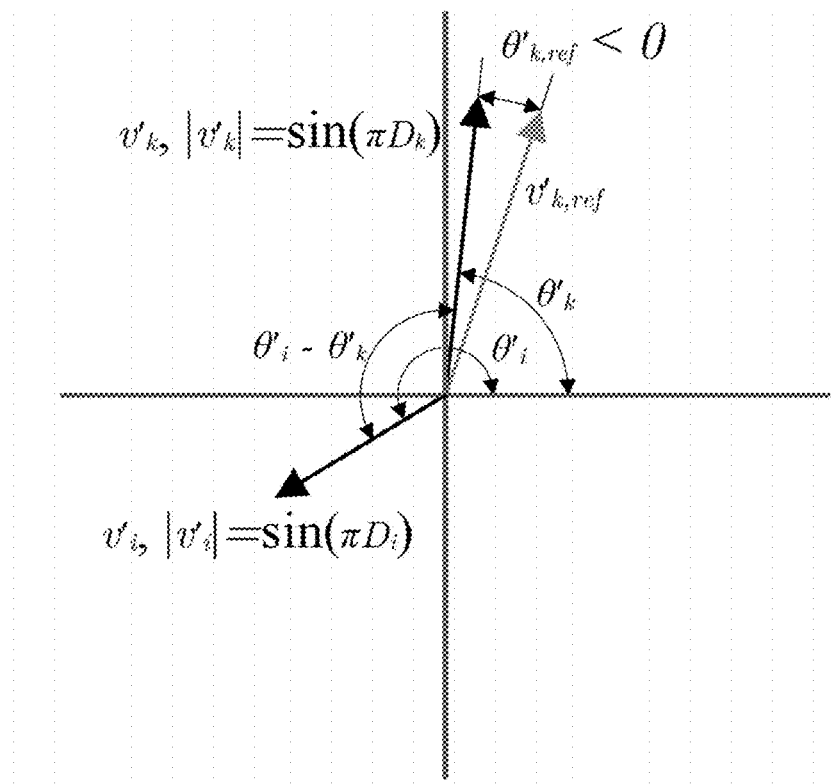
FIG. 5 illustrates using oppositely directed vectors to minimise ripple current.

Graphically, setting (6) to zero is equivalent to "pointing" the weighted vector $v_k'$ in either 1) an opposite direction, or 2) the same direction, to all of the other weighted vectors $v_{i, i \neq k}'$ summed together. Clearly, by "pointing" $v_k'$ in the same direction as $\Sigma_i v_{i, i \neq k}'$ would result in large currents in the inductor since all of the cells would eventually be in phase, maximizing the ripple current. However, if we chose to direct $v_k'$ in the opposite direction to $\Sigma_i v_{i, i \neq k}'$, the current through the inductors will be reduced and (5) will be minimized. This can be accomplished with the controller described in equation (7) below. FIG. 5 summarizes this observation.

Therefore, during each iteration of the smart cell controller, every smart cell will sum up the weighted vectors of all of the other smart cells it senses, and set its local reference to be 180 degrees away from that sum. By doing this, each smart cell will be driving (6) to zero, thus finding a local minimum to (5). Using this controller design, (7) defines the reference angle, $\theta_{k,ref}'$, for the kth smart cell's weighted sum vector, $v_k'$.

$$\theta_{k,ref}' = -2\sin(\pi D_k) \sum_{i=1; i \neq k}^{M} \sin(\pi D_i)\sin(\pi(D_i - D_k) + \theta_i - \theta_k) \quad (7)$$

Note the negative sign in (7), this ensures that that the angle between $\theta_{k,ref}'$ and $\Sigma_i v_{i, i \neq k}'$ is driven to $\pi$. Using (7) and the angle transformation of (3), a non-linear model for the $k^{th}$ smart cell controller can be constructed, and is shown below:

$$\dot{\theta}_k' = \omega_k - 2\frac{K}{M}\sin(\pi D_k) \sum_{i=1; i \neq k}^{M} \sin(\pi D_i)\sin(\theta_i' - \theta_k') \quad (8)$$

where $\omega_k$ is the switching frequency, and K is a controller constant.

SOC Controller Design

The SOC of each smart cell is regulated by synchronizing its SOC with the average SOC of a series string of smart cells, which is determined by analysing $v_l$, the voltage across the sense inductor, $L_{SC}$. The SOC controller assumes that the string of smart cells is composed of cells of the same chemistry, so that there is a consistent relationship between the SOC and cell terminal voltage throughout the string.

As shown in FIG. 3 every time a smart cell switches in and out of the string, the voltage that it switches will be sensed by all of the sense inductors in the string of smart cells. Therefore, by calculating the differences in the levels of the $v_l$ waveform, the terminal voltage of the cell that switched in or out can be extracted by each smart cell. Averaging all of these differences yields an average terminal voltage for the series string of smart cells. In order to account for variations in the inductance of $L_{SC}$ and the sensing hardware, the gain of the $v_l$ sensor may be measured and adjusted every time the SOC controller is executed. Since the local cell knows its duty cycle and phase, it can determine which transitions in the $v_l$ waveform are caused by its cell switching in and out of the circuit. Using these transitions, along with the local cell voltage measurement, the local cell can calculate the gain of its $v_l$ sensor to correctly determine the voltages of the other cells switching in and out of the circuit.

Figure 6:
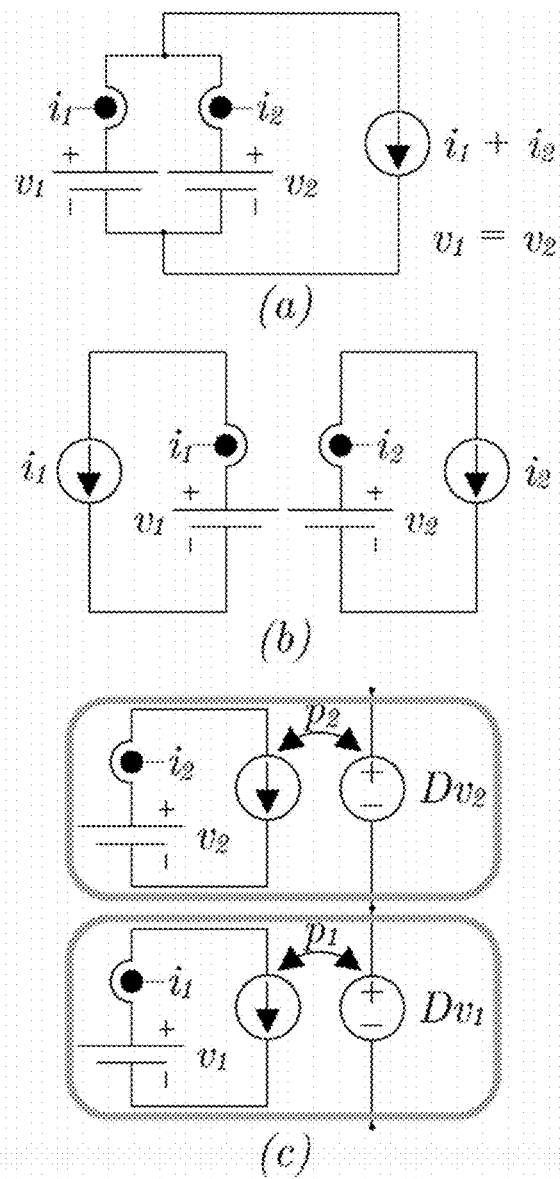
FIG. 6 illustrates how synchronising terminal voltage is equivalent to parallel operation.

The SOC controller adjusts the duty cycle of the local cell using a simple proportional-integral (PI) controller to synchronize its terminal voltage with the string's average terminal voltage. Operation in this manner is equivalent to operating the cells in parallel, as shown in the two cell example of FIG. 6. When two cells form a parallel pack of parallel cells, their terminal voltages are equal, and their output currents are $i_1$ and $i_2$, where $i_1$ is not necessarily the same as $i_2$, as shown in FIG. 6 (a). One can split up this parallel connection, and load each cell individually with $i_1$ and $i_2$ such that their terminal voltages are still equal, as shown in FIG. 6 (b). Thus, the two cells are operating as if they were connected in parallel. Finally, one can place the two cells in series as shown in FIG. 6 (c), operating them with currents $i_1$ and $i_2$, such that their terminal voltages are equal, and using a power converter to enable the series connection. The SOCs of parallel connected cells are considered to be nearly identical, and require no further management. Thus, the SOC of series connected smart cells will also be well synchronized, without having to directly compute their SOC.

Implementation of the Control Algorithm

A MATLAB-Simulink model of a smart cell using the theory outlined in this document was built using the SimPowerSystems toolbox. The model used the Simscape battery model and MOSFETs to simulate the power circuit. The controller was implemented as an embedded MATLAB function, and was executed once per switching cycle when the upper MOSFET, $Q_H$, is switched on.

Figure 7:
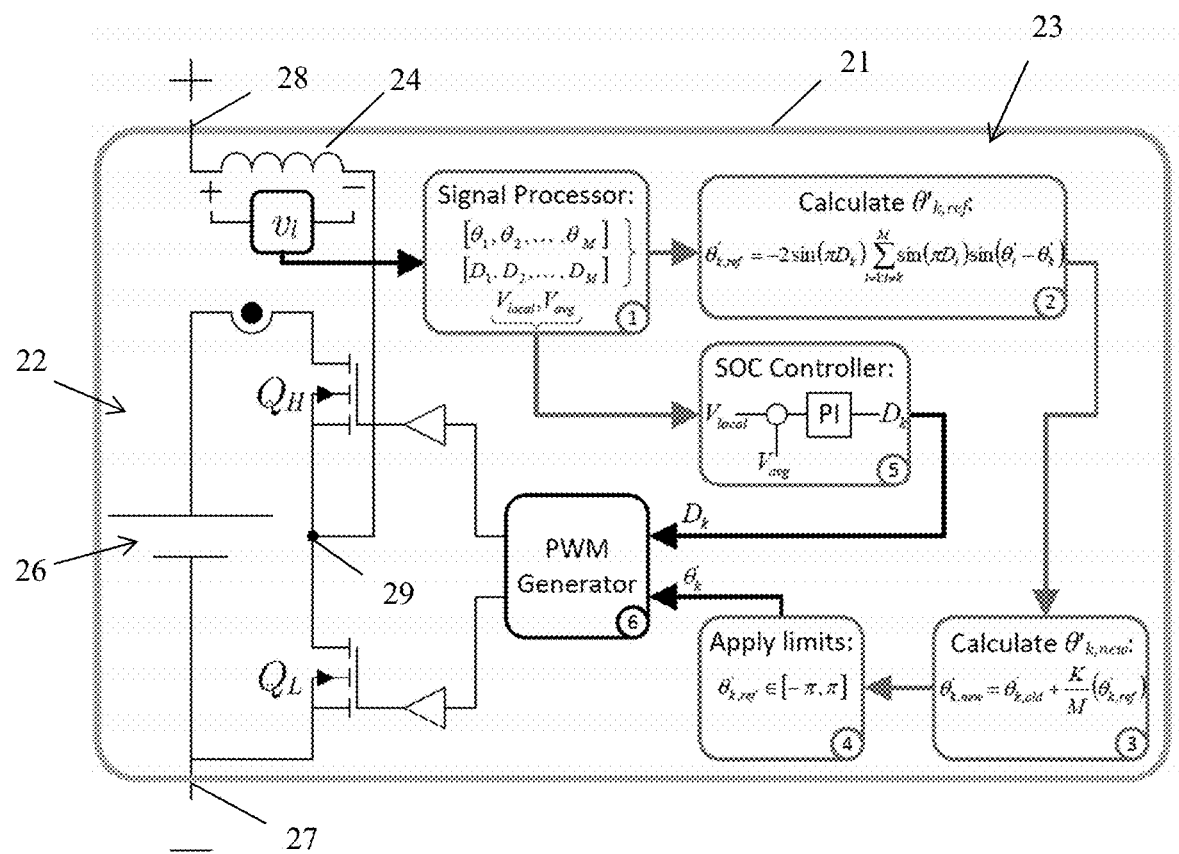
FIG. 7 illustrates the processing steps of a controller.

FIG. 7 illustrates the algorithm the controller implements as a block diagram. Steps 1 through 5 below were implemented by the embedded MATLAB function.

1. Signal Processor: Detects all of the positive and negative transitions that occur during every switching cycle, $T_s$. The local cell voltage, $V_{local}$, and the average cell voltage, $V_{avg}$, are measured using the levels of the $v_l$ waveform. The edge detector also keeps track of the number of smart cells sensed in the string with a simple low pass filter to average the number of smart cells.
2. Calculate $\theta_{k,ref}'$: A new reference phase shift is calculated using (7).
3. Calculate $\theta_{k,new}'$: The new phase that will be sent to the PWM generator is calculated by the phase controller.
4. Apply limits: $\pm 2\pi$ is added to $\theta_{k,ref}'$ until it lies between $-\pi$ and $\pi$.
5. SOC Controller: A new duty cycle is computed using $V_{local}$ and $V_{avg}$. The updated duty cycle, $D_k$, is sent to the PWM module.
6. PWM Generator: $\theta_{k,new}'$ is used by the PWM generator to produce gating signals for the MOSFETs.

The phase control loop, defined by steps 1 to 4 in FIG. 7, runs a hundred times faster than the SOC control loop. The SOC control loop is defined by steps 1 and 5, and will not modify the duty cycle unless the phase controller has reached a steady state value.

The embedded MATLAB function that implements the controllers, was converted into C++ code by MATLAB's coder toolbox, for easy integration into the hardware.

Simulation Study of the Phase Controller

A simulation study of a series string of three smart cells was undertaken to investigate the stability of the phase controller. Table I lists the simulation parameters used. The controller gain, K, was chosen through experimentation.

TABLE I

Parameters of the three smart cell simulation study

| Description | Parameter | Value |
| --- | --- | --- |
| Battery Cell Capacities | $C_1$ | 0.75 Ah |
|  | $C_2$ | 1.20 Ah |
|  | $C_3$ | 3.00 Ah |
| Smart Cell Parameters | $L_{sc}$ | 100 µH |
|  | $f_s$ | 20 kHz |
|  | $V_{nom}$ | 4.19 V |
| Output | $C_{out}$ | 54.7 µF |
|  | R | 4.8 Ω |
| Control Parameters | K | 10 |

The simulation consisted of the three smart cells operating completely independently of each other. The optimal switching controller was turned on 1.0 ms into the simulation. A value of $C_{MAX}$=4.00 Ah was pre-programmed into each smart cell, in order for each smart cell to calculate its local duty cycle according to (1). This pre-programming was in order to provide an initial condition for this simulation as the SOC controller was not running for this simulation.

Figure 8:
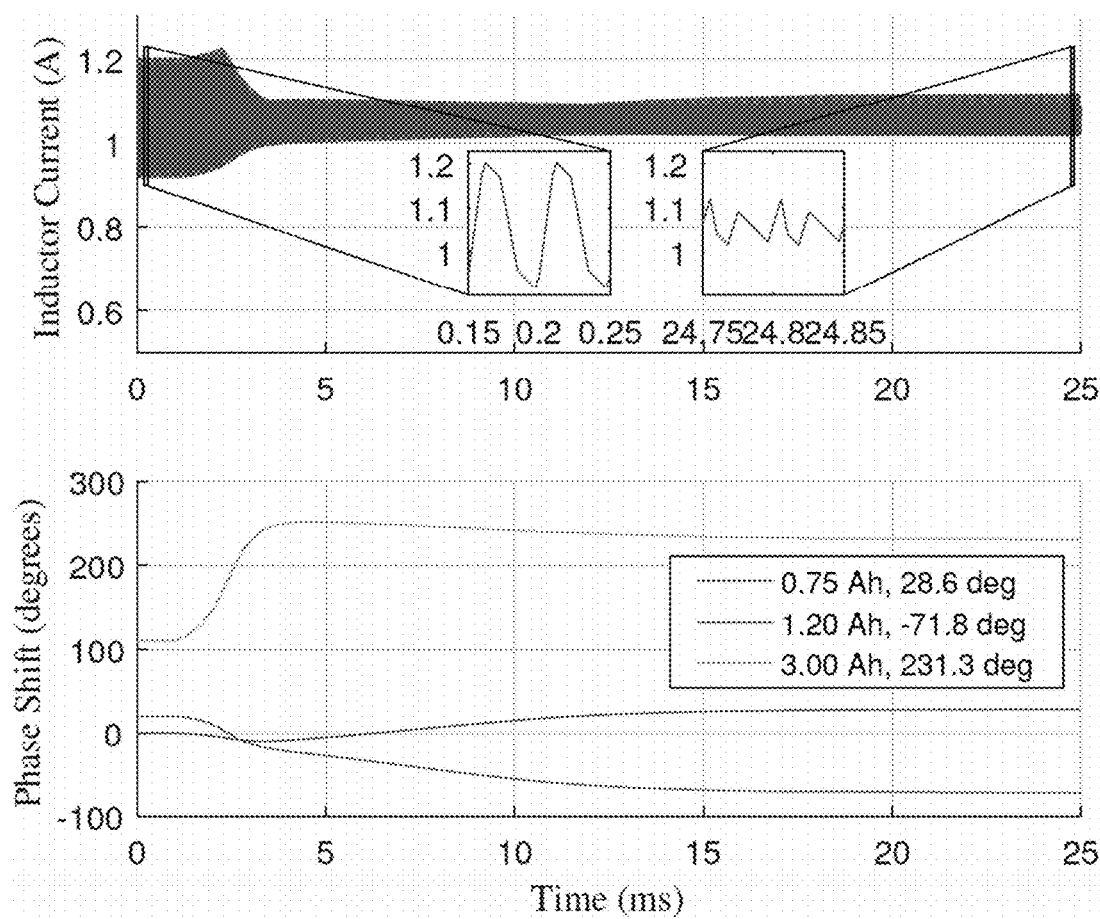
FIG. 8 shows the results of a simulation.

FIG. 8 shows how different characteristics of the system evolve over the length of the simulation. The smart cells initially all turn on at the same time, which produces a very high ac rms ripple current in the inductor, as shown in the inset graphs. At the beginning of the simulation, $I_{Lac-rms}$ is 103 mA rms, and the peak-to-peak output voltage, $v_{out-pp}$, is 43 mV. After the optimal switching controller is engaged, the phase shift of each smart cell gradually evolves smoothly into its steady state value. At the end of the simulation, $I_{Lac-rms}$ and $v_{out-pp}$ have improved considerably to 26 mA and 6 mV, respectively. The amount of ripple current and ripple voltage reduction will depend heavily on duty cycles of the smart cells, thus a different group of smart cells may have less or more ripple reduction than shown here.

Experimental Results

Hardware Setup

The theory described in this document was tested in the laboratory with an experimental setup consisting of three smart cells in series, as shown in FIG. 2 using the parameters listed in Table I. The hardware was built around ARM's mbed platform, where each smart cell is implemented with the NUCLEO-F401RE board and a custom printed circuit board (PCB) containing the power stage. The inputs of each smart cell PCB was connected to a small pack of parallel connected 18650 lithium-ion cells, in order to simulate battery cells of varying capacities. Table II lists the capacities of the equivalent cell connected to each smart cell, as measured by a Neware Battery Tester, 8 Channel 5V20A-NTFA. The cells used were manufactured by Samsung, model number INR18650-29E. The outputs of the smart cells were connected in series, and attached to a 4.8Ω resistive load.

TABLE II

Cell capacities used to test three smart cell PCBs in the laboratory

| Cell | Number of 18650 Cells | Measured Capacity |
| --- | --- | --- |
| 1 | 3 | 7.97 Ah |
| 2 | 3 | 8.10 Ah |
| 3 | 2 | 5.31 Ah |

The NUCLEO-F401RE board was chosen for its relatively powerful micro-controller, the STM32F401RET6, in order to focus attention on how the smart cell controller can be implemented in hardware. The STM32F401RET6 is based on the ARM 32-bit Cortex-M4 CPU and has a floating point unit. The analog to digital converter of the STM32F401RET6 was configured to its highest sample rate of 2.8 MHz while maintaining 12 bit sampling resolution, to capture the details of the $v_l$ waveform.

Phase Controller Performance

A first experiment using the pre-programmed capacities of Table I was carried out to verify the performance of the phase controller, whose role is to reduce the ac-rms current through the series string of smart cells.

Figure 9:
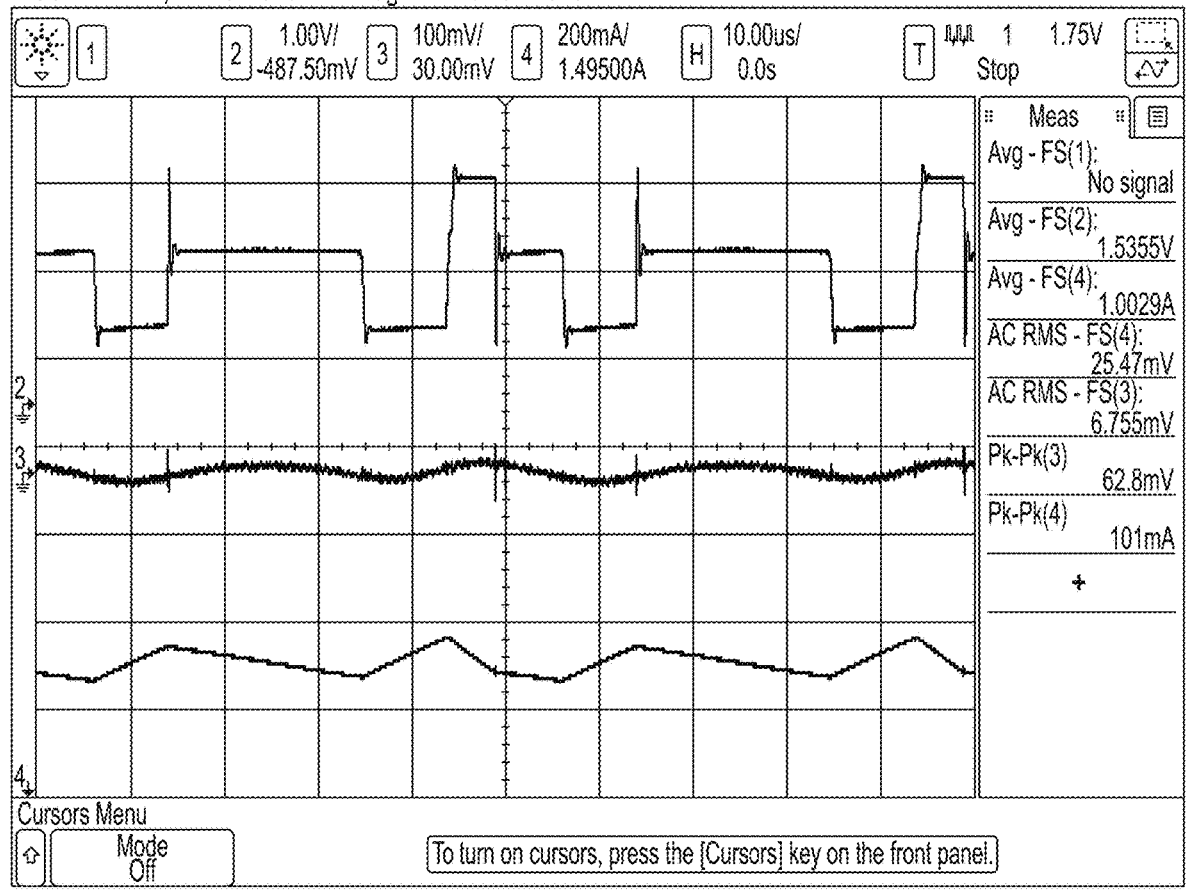
FIG. 9 shows an oscilloscope screenshot of an experiment.

FIG. 9 shows an oscilloscope screen shot of the four smart cells operating and finding their optimal switching pattern. The peak-to-peak voltage ripple from the experiments was reduced to 23 mV from 145 mV and the ac-rms $L_{sc}$ ripple current was reduced to 25 mA from 95 mA. Note that the peak to peak value calculated by the oscilloscope, and shown in FIG. 9, includes some switching noise, which was ignored for the peak to peak output voltage measurements.

FIG. 9 shows an oscilloscope screen shot of the three smart cells operating at their optimal switching pattern, averaging applied with 8 samples. Channel 2 (top trace) is the voltage across $L_{sc}$ of the first smart cell with a capacity of $C_1$. Channel 2 (middle trace) is the output voltage ripple. Channel 3 (bottom trace) is the current in the smart cell inductors.

The smart cells operating in FIG. 9 settled to the same switching pattern as the simulated cells in the above section "Simulation study of the phase controller".

SOC Controller Performance

A second experiment to verify the performance of the SOC controller was also conducted. Each smart cell was connected to a fully charged set of cells, as listed in Table II. However, unlike the previous experiments and simulations, each smart cell started by operating with a duty cycle of 0.5. It became the role of the SOC Controller to correct the mismatch in duty cycles to ensure all three smart cells discharged proportional to their capacity.

Figure 10:
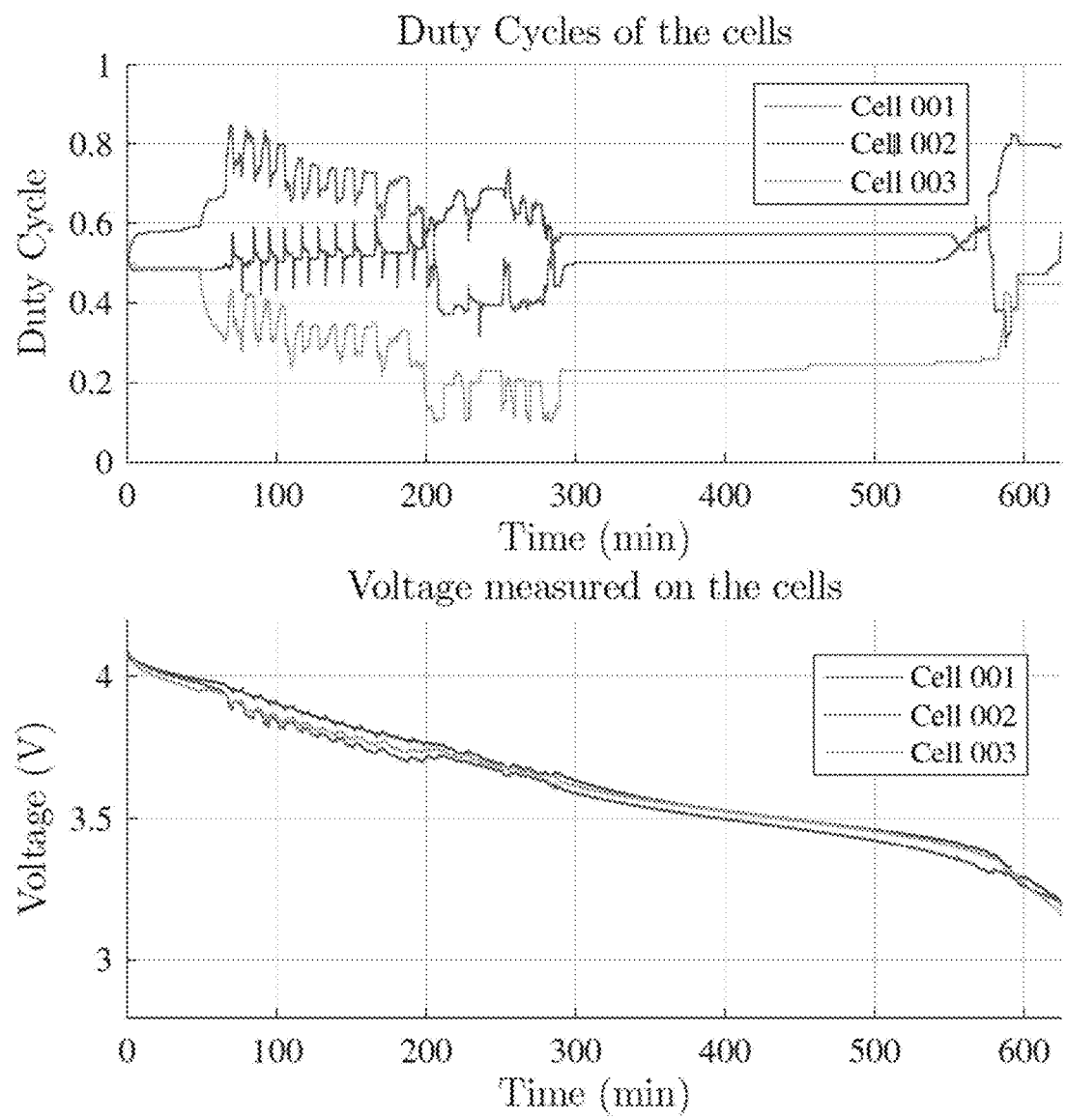
FIG. 10 shows how cell voltages and duty cycles evolved during the experiment.

During operation, the SOC controller estimates the average string voltage by calculating the difference in levels as described in the above section "SOC Controller Design". FIG. 10 shows how the cell voltages and duty cycles evolved over time during the experiment.

As shown in FIG. 10, the duty cycles vary quite a bit during operation. This is due to the operation of the SOC controller, attempting to yield accurate voltage information from the string of switching smart cells. Since the controller relies on measuring the difference between levels to measure the average string voltage, there are moments during operation where these levels are non-existent, for example, when all of the duty cycles sum to a positive integer. Therefore, to counteract this possibility, if a cell senses that it has not been able to measure the string voltage for more than 2.5 minutes (although it will be appreciated that this is a non-limiting example time), it increases or decreases its duty cycle by a fixed amount. This will introduce levels into the voltage measured across $L_{sc}$, and the cells will be able to measure the average string waveform. This is exactly what is happening from about 75 minutes to 200 minutes in the experimental results of FIG. 10. Cell 001 is modifying its duty cycle to get a better string measurement. As a result, "Steps" in the duty cycle are generated by the SOC Controller when an average string voltage measurement cannot be obtained.

Due to the limited sampling resolution of the analog to digital converter, each cell implements a ±10 mV dead zone around its reference voltage.

Figure 11:
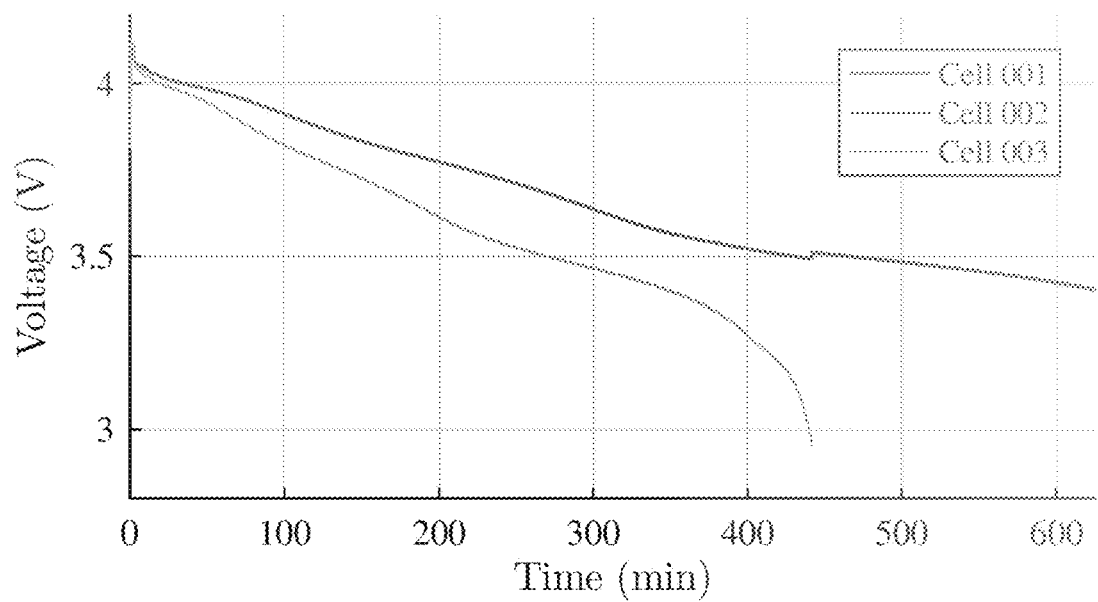
FIG. 11 shows the evolution of cell voltages with the SOC controller disabled.

At the end of the experiment, the cells were allowed to rest for 10 minutes, and their voltages were measured. The results are shown in Table III, and they are all within 50 mV of each other. This is a very good result considering there is no communication between any of the smart cells. Furthermore, if the SOC controller was not operating, the string imbalance would have been much greater as shown in FIG. 11, where the smallest capacity cell discharges in around 450 minutes, clearly limiting the pack performance compared to the SOC controlled case.

TABLE III

Cell voltages at the end of the SOC Controller experiment after 10 minutes rest.

| Cell | Voltage (V) |
|---|---|
| 1 | 3.162 |
| 2 | 3.140 |
| 3 | 3.113 |

It will thus be appreciated that a completely decentralized battery management system has been described here, based around the concept of a smart cell. The smart cell was built around (1) a phase controller, that synchronized all of the switching actions of the cells to minimize the output voltage ripple, and (2) a SOC controller which adjusted the duty cycle of the local smart cell to synchronize the local cell's voltage with the pack voltage, and thus, its state of charge.

In the systems described here, the voltage across the filtering inductor was measured to yield the switching states, and the average state of charge of the system. While the above description is focused on synchronization of the states of charge of a series string of smart cells, the techniques described here have applications in many other areas.

For example, as presented here, the smart cell concept has been shown to operate at the cell level. However, the same decentralized controller can be employed at higher power levels to break a series string of battery cells into packs instead of individual cells.

The smart cell may include the implementation of a complete battery management system at the cell level, where the state of health, and state of charge are managed by the decentralized controller. In particular, the SOC Controller may be augmented with a battery model to improve its performance.

Finally, some of the phase synchronization techniques presented here can be used to create completely decentralized MMC converters. Using a simple modification of multiplying (7) by −1, the smart cells can be designed to synchronize their switching actions to produce sinusoidal output waveforms as depicted in FIG. 12.

Figure 12:
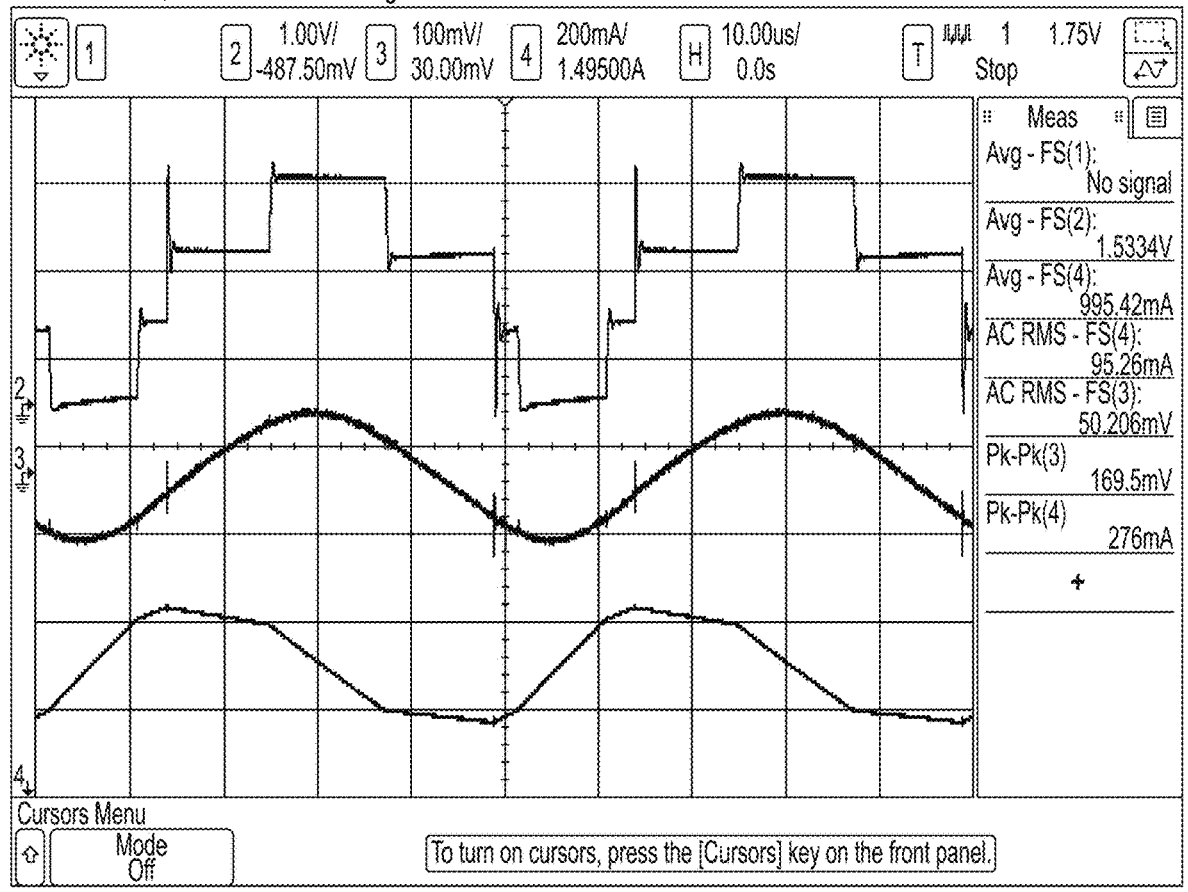
FIG. 12 shows an oscilloscope screenshot of another experiment with smart cells operating with synchronised switching.

More specifically FIG. 12 shows an oscilloscope screen shot of the three smart cells operating with synchronized switching, averaging applied with 8 samples. Channel 2 (top trace) is the voltage across $L_{sc}$ of the first smart cell with a capacity of $C_1$. Channel 2 (middle trace), is the output voltage ripple. Channel 3 (bottom trace) is the current in the smart cell inductors.

The invention claimed is:

1. A smart cell, comprising:
   a positive terminal;
   a negative terminal;
   a switching circuit which is arranged to select between a first switching state in which an energy storage device is connected between the positive terminal and the negative terminal and a second switching state which bypasses said energy storage device;
   an inductor provided between the positive terminal and the negative terminal; and
   a controller arranged to monitor the voltage across the inductor and arranged to control a duty cycle of the switching circuit based on the magnitudes of voltage changes detected across the inductor.

2. The smart cell as claimed in claim 1, wherein the controller is arranged to control the duty cycle of the switching circuit based on the magnitudes of voltage changes detected across the inductor and a value representative of a current state of charge of the energy storage device.

3. The smart cell as claimed in claim 1, wherein the controller is arranged to calculate a value representative of the average state of charge of all other energy storage devices connected in series or parallel with the smart cell, or a value representative of the average state of charge of the energy storage device of the smart cell in addition to the other energy storage devices connected in series or parallel with the smart cell.

4. The smart cell as claimed in claim 3, wherein said value representative of the average state of charge is the average of the magnitudes of voltage changes detected across the inductor.

5. The smart cell as claimed in claim 3, wherein the controller is arranged to control the duty cycle of the switching circuit so as to synchronise the state of charge of the energy storage device with the calculated average state of charge.

6. The smart cell as claimed in claim 5, wherein the controller controls the duty cycle of the switching circuit with a proportional-integral controller.

7. The smart cell as claimed in claim 1, wherein said inductor is in series with said switching circuit.

8. The smart cell as claimed in claim 1, wherein the controller is arranged to adjust the switching timing of the switching circuit based on said inductor voltage.

9. The smart cell as claimed in claim 8, wherein the controller is arranged to determine, based on said inductor voltage, a desired switching timing for the switching circuit that minimises the impact on voltage ripple and is arranged to adjust the switching timing for the switching circuit towards the desired switching timing.

10. The smart cell as claimed in claim 9, wherein the controller is arranged to adjust the switching timing at a rate proportional to the duty cycle of the switching circuit.

11. The smart cell as claimed in claim 8, wherein the controller is arranged to adjust the switching timing by adjusting the switching period of the smart cell.

12. The smart cell as claimed in claim 8, wherein the controller is arranged to adjust the switching timings by adjusting the switching timing at a rate proportional to the duty cycle of the smart cell.

13. The smart cell as claimed in claim 8, wherein the controller comprises a switching phase controller arranged to adjust the switching timing of the switching circuit in a first control loop and a state of charge controller arranged to adjust the duty cycle of the switching circuit in a second control loop.

14. The smart cell as claimed in claim 13, wherein the first control loop is operated at a higher rate than the second control loop.

15. The smart cell as claimed in claim 13, wherein the state of charge controller will not modify the duty cycle until the phase controller has reached a steady state condition.

16. A smart cell system comprising a plurality of smart cells according to claim 1, said plurality of smart cells being connected in series.

* * * * *